United States Patent [19]

Chi

[11] Patent Number: 4,738,551

[45] Date of Patent: Apr. 19, 1988

[54] BICYCLE BOTTOM AXLE CUP ASSEMBLY

[75] Inventor: Yi-Chen Chi, Taichung, Taiwan

[73] Assignee: Yu-Sheng Traffic Parts Co., Ltd., Hou-Li Ssiang, Taiwan

[21] Appl. No.: 49,232

[22] Filed: May 13, 1987

[51] Int. Cl.⁴ .................................... F16C 23/06
[52] U.S. Cl. ...................... 384/519; 384/540; 384/545
[58] Field of Search ............ 384/519, 545, 540, 262, 384/258, 583

[56] References Cited

U.S. PATENT DOCUMENTS

| 695,682 | 3/1902 | Glover | 384/545 |
| 1,377,637 | 5/1921 | Stangland | 384/540 |
| 4,406,504 | 9/1983 | Coenen et al. | 384/545 |
| 4,545,691 | 10/1985 | Kastan et al. | 384/540 |

Primary Examiner—Lenard A. Footland
Attorney, Agent, or Firm—Beveridge, DeGrandi & Weilacher

[57] ABSTRACT

An improved bicycle bottom axle cup assembly comprising a five way pipe, an axle, two cups, two ball bearings, an adjustable connector, a lock ring and a packing ring, and constructed in such way that it can be assembled without any five way pipe and adjusted to meet the need of bottom axles of different lengths.

1 Claim, 4 Drawing Sheets

BICYCLE BOTTOM AXLE CUP ASSEMBLY

BACKGROUND AND SUMMARY OF THE INVENTION

A conventional bicycle bottom axle cup assembly as shown in FIGS. 1 and 2 comprises a five way pipe 4, an axle 3, two cups 1, 6, two ball bearings 2, 5 and a lock ring 7. To assemble, the cup 1 must first be screwed in the opening 41 of the five way pipe 4 then the axle 3 is fitted in the ball bearing 2 and inserted in the five way pipe 4. The ball bearing 5 is fitted on the axle 3. The cup 6 is screwed in the opening of the five way pipe. Finally, the lock ring is screwed on to lock the cup 6.

From the above, it is clear that the conventional assembly has the following disadvantages:

1. The assembly can not be assembled without the five way pipe. It is inconvenient to pack, transport and assemble.
2. The length of the assembly is fixed and particular assemblies must be made to meet the need of five way pipes and axles of fixed lengths.

In view of this, the inventor worked hard to make improvements and developed this invention.

So the main object of this invention is to provide an improved bicycle bottom axle cup assembly which comprises an adjustable connector and can be adjusted to meet the need of bicycle axles of different lengths.

Another object of this invention is to provide an improved bicycle bottom axle cup assembly which can be assembled without five way pipe so as to facilitate packing, transporting and assembling.

DETAILED DESCRIPTION OF THE PREFERRED EMBODIMENT

Figure 1:
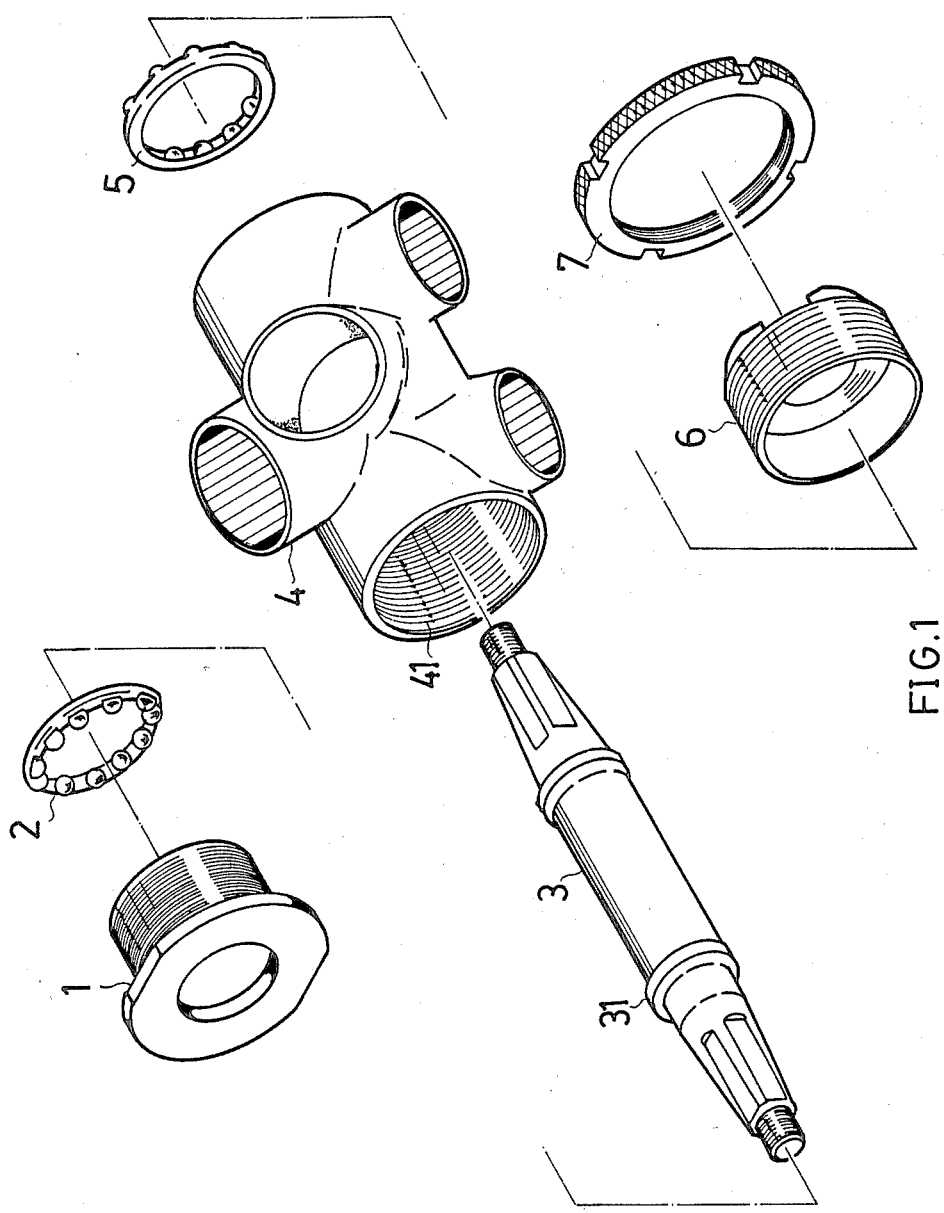
FIG. 1 is an exploded view of the conventional bicycle bottom axle cup assembly.
Figure 2:
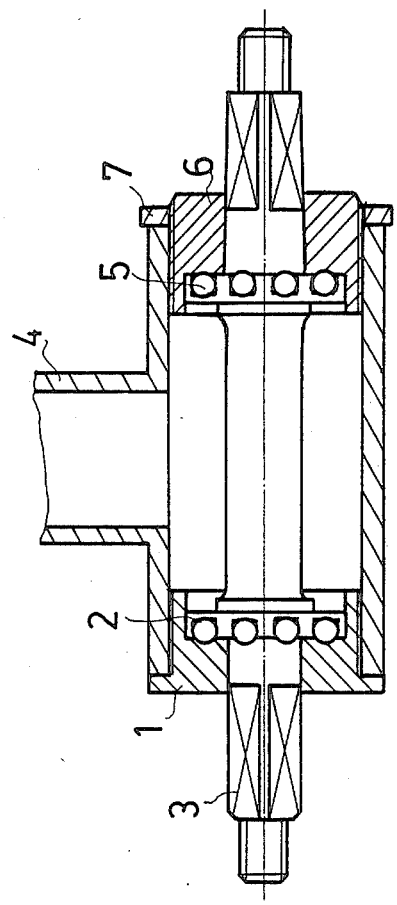
FIG. 2 is a vertical section of the conventional bicycle bottom axle cup assembly.
Figure 3:
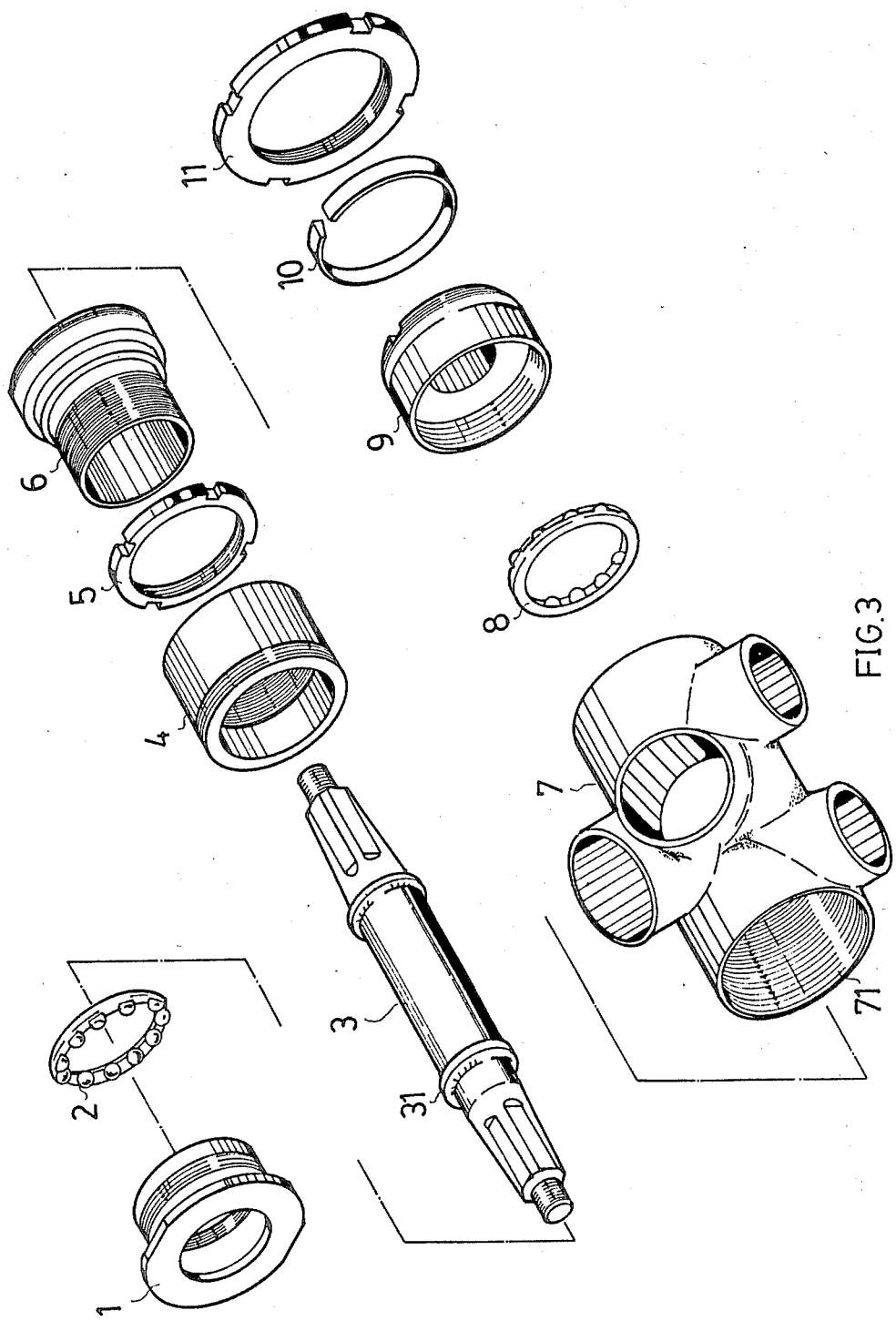
FIG. 3 is an exploded view of the improved bicycle bottom axle cup assembly of this invention.
Figure 4:
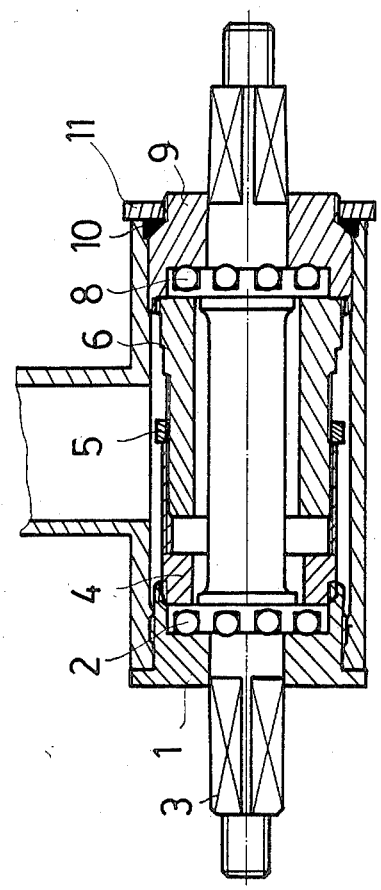
FIG. 4 is a vertical section of the said device.

As shown in FIG. 3 and FIG. 4, the improved bicycle bottom axle cup assembly comprises a five way pipe 7, an axle 3, two ball bearings 2, 8 two cups 1, 9, two lock rings 5, 11, two adjustable connector members 4, 6 and a packing ring 10.

To assemble, the ball bearing 8 is put in the cup 9 which is then screwed on the adjustable connector member 6. After the lock ring 5 is screwed on, the adjustable connector member 6 is screwed in the adjustable connector member 4 to form an adjustable connector. Then, the cup 1 is fitted in the opening 71 of the five way pipe 7. The adjustable connector, the axle 3 and the ball bearing 2 are assembled in this order and inserted in the five way pipe 7 until the end part of the axle 3 comes out of the cup 1 and is stopped at the collar 31 by the same. With the packing ring 10 fitted on the adjustable connector member 6, the lock ring 11 is screwed on the same.

From the above it is clearly seen that the connector consisting of two members 4, 6 and a lock ring 5 can be adjusted in length to meet the need of axles of different lengths (distances between two collars of the axle).

With the slit and miter cut packing ring 10, the lock ring 11 can be fitted tightly on the adjustable connector member 9.

The set of elements can be assembled without any five way pipe. So it is very convenient to pack, transport and assemble.

I claim:

1. An improved bicycle bottom axle cup assembly charaterized by comprising an axle, two cups, two ball bearings, an adjustable connector consisting two members and a lock ring, another lock ring and a packing ring with a slit and miter cut, and constructed in such way that it can be assembled without any five way pipe and adjusted to meet the need of bicycle bottom axles of different lengths.

* * * * *